United States Patent
Abe

(10) Patent No.: US 8,080,979 B2
(45) Date of Patent: Dec. 20, 2011

(54) CHARGING SYSTEM AND CHARGER UTILIZING BATTERY STATE INFORMATION RECEIVED FROM A BATTERY UNIT TO DETERMINE IF THE BATTERY UNIT IS IN A NORMAL STATE

(75) Inventor: Takamitsu Abe, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 353 days.

(21) Appl. No.: 12/268,843

(22) Filed: Nov. 11, 2008

(65) Prior Publication Data

US 2009/0167252 A1 Jul. 2, 2009

(30) Foreign Application Priority Data

Dec. 27, 2007 (JP) ................................. 2007-336845

(51) Int. Cl.
*H02J 7/00* (2006.01)
(52) U.S. Cl. ........ 320/134; 320/136; 320/152; 320/162; 320/163; 320/164
(58) Field of Classification Search .................. 320/134, 320/136, 152, 162, 163, 164
See application file for complete search history.

(56) References Cited

U.S. PATENT DOCUMENTS

| 5,994,878 | A | * | 11/1999 | Ostergaard et al. | ........... 320/132 |
| 6,118,255 | A | * | 9/2000 | Nagai et al. | .................... 320/152 |
| 2005/0248311 | A1 | | 11/2005 | Komaki et al. | |

FOREIGN PATENT DOCUMENTS

| CN | 1302467 A | 7/2001 |
| JP | 10-201109 A | 7/1998 |
| JP | 2005-065461 A | 3/2005 |
| JP | 2005-321983 A | 11/2005 |

* cited by examiner

*Primary Examiner* — Edward Tso
*Assistant Examiner* — Manuel Hernandez

(57) ABSTRACT

A charger that charges a battery unit including a secondary battery, includes a receiving unit, a detection unit, a determination unit, and a control unit. The receiving unit receives, from the battery unit, battery state information indicating a state of the battery unit, if the secondary battery is being charged. The detection unit detects charge state information indicating the state of the battery unit, if the secondary battery is being charged. The determination unit determines, using the battery state information and the charge state information, whether the battery unit is in a normal state. The control unit controls charging of the secondary battery in the battery unit depending on whether the battery unit is in the normal state.

16 Claims, 4 Drawing Sheets

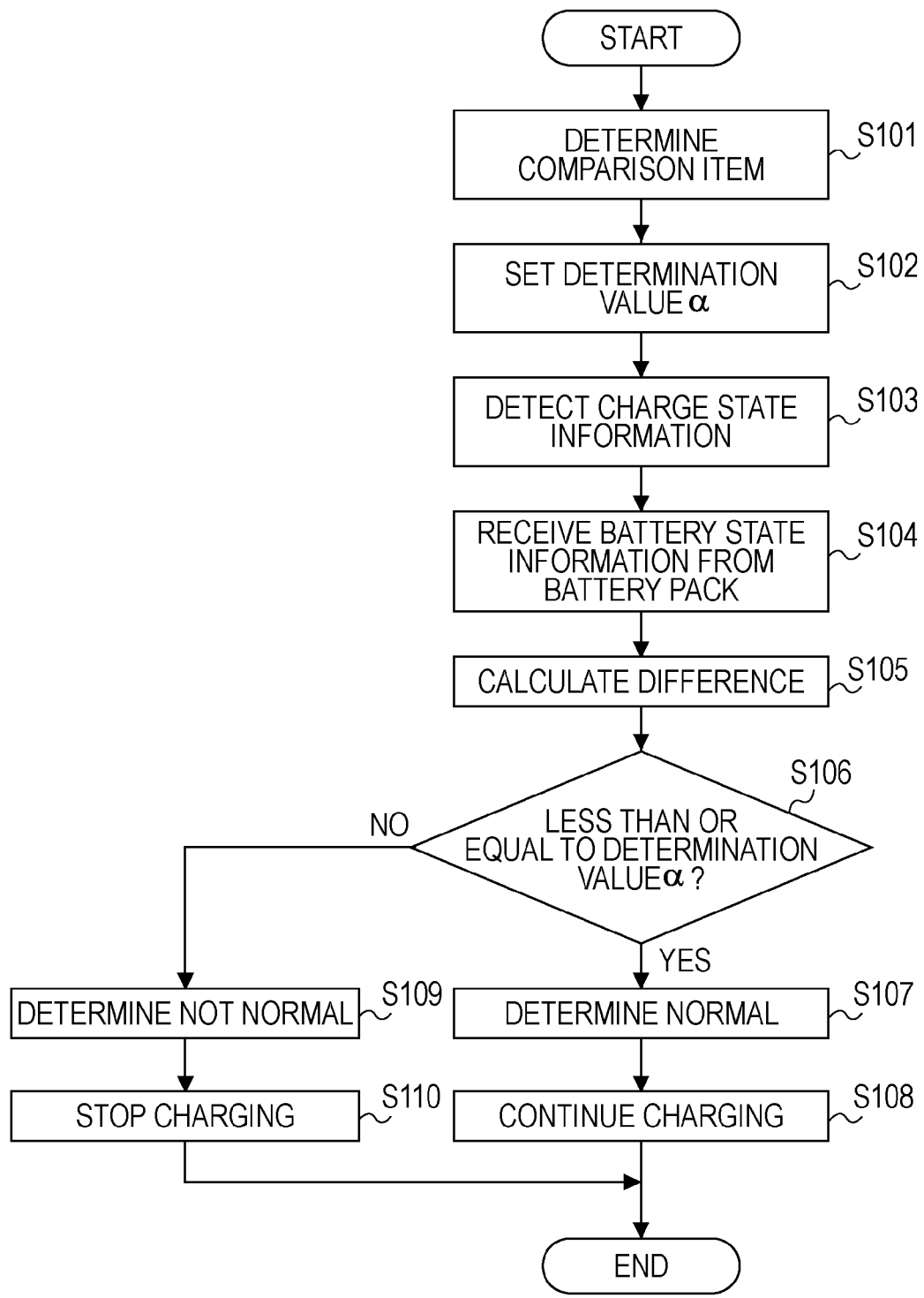

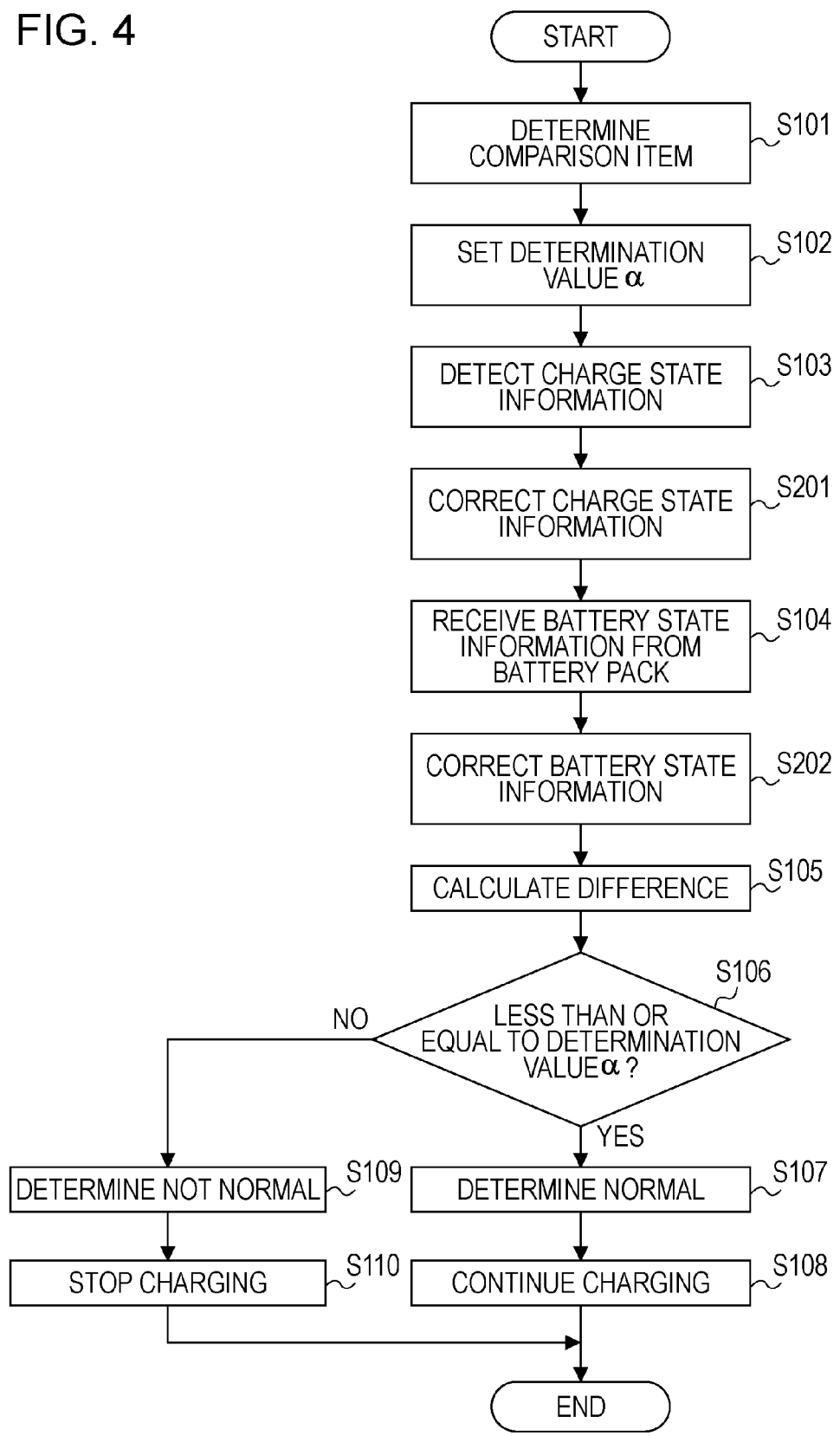

CHARGING SYSTEM AND CHARGER UTILIZING BATTERY STATE INFORMATION RECEIVED FROM A BATTERY UNIT TO DETERMINE IF THE BATTERY UNIT IS IN A NORMAL STATE

BACKGROUND OF THE INVENTION

1. Field of the Invention

The present invention relates to a charger and a charging system including the charger.

2. Description of the Related Art

In a method of charging a secondary battery such as a lithium-ion battery, a charger measures a charging voltage, a charging current, and a partial voltage of a battery pack, and controls charging of the battery pack. Japanese Patent Application Laid-Open No. 10-201109 discusses a charging system that a charger can be communicated with a battery pack and controls charging.

In the foregoing example of the related art, the charger controls charging depending on information of the battery pack which is received from the battery pack. However, the charger of the related art is incapable of determining, using the information of the battery pack which is received from the battery pack, whether an error has occurred in the battery pack.

SUMMARY OF THE INVENTION

The present invention is directed to a charger and a charging system for determining, using information of the battery pack which is received from the battery pack, whether a battery pack is in a normal state. The present invention is directed to a charger and a charging system for safely controlling an operation of charging a battery pack.

According to an aspect of the present invention, a charger that charges a battery unit including a secondary battery, includes a receiving unit that receives, from the battery unit, battery state information indicating a state of the battery unit, if the secondary battery is being charged; a detection unit that detects charge state information indicating the state of the battery unit, if the secondary battery is being charged; a determination unit that determines, using the battery state information and the charge state information, whether the battery unit is in a normal state; and a control unit that controls charging of the secondary battery in the battery unit depending on whether the battery unit is in the normal state.

According to an aspect of the present invention, a charging system includes a battery unit including a secondary battery; and a charger that charges the secondary battery. The battery unit includes a first detection unit that detects battery state information indicating a state of the battery unit, if the secondary battery is being charged; and a sending unit that sends the battery state information to the charger. The charger includes: a second detection unit that detects charge state information indicating a state of the battery unit, if the secondary battery is being charged; a receiving unit that receives the battery state information from the battery unit, if the secondary battery is being charged; a determination unit that determines, using the battery state information and the charge state information, whether the battery unit is in a normal state; and a control unit that controls charging of the secondary battery in the battery unit depending on the battery unit is in the normal state.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the present invention and, together with the description, serve to explain the principles of the present invention.

FIG. 3 is a flowchart describing a measurement value checking operation of the charger according to the first embodiment.

FIG. 4 is a flowchart describing a measurement value checking operation of the charger according to a second embodiment.

DESCRIPTION OF THE EMBODIMENTS

Various exemplary embodiments, features, and aspects of the present invention will now be described in detail below with reference to the attached drawings.

First Embodiment

Figure 1:
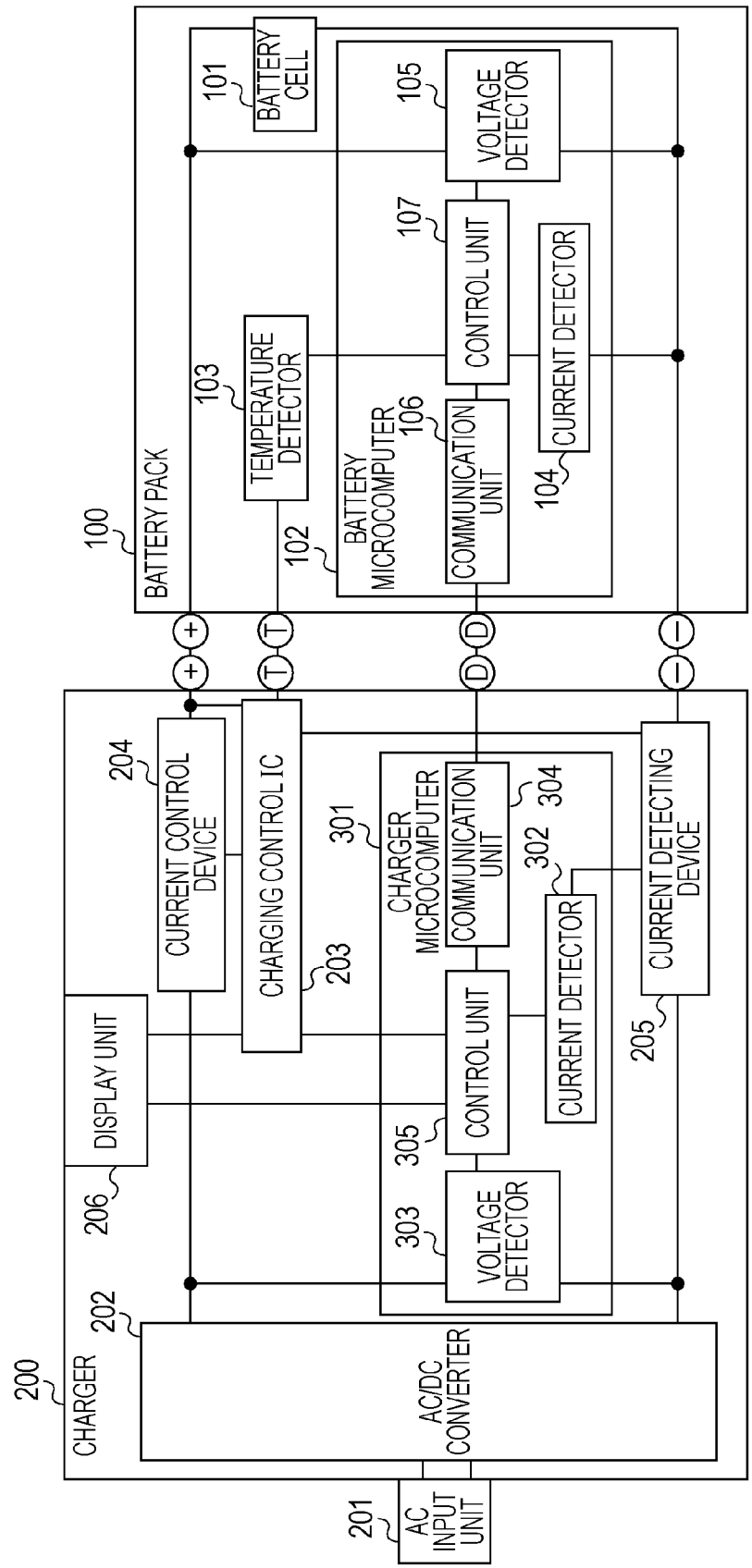
FIG. 1 is a block diagram showing an exemplary configuration of a charger and a battery pack according to a first embodiment of the present invention.

FIG. 1 is a block diagram showing an exemplary configuration of a charging system according to a first embodiment of the present invention. The charging system shown in FIG. 1 includes a charger 200 and a battery pack 100. The charger 200 can charge the battery pack 100 attached to the charger 200.

The battery pack 100 includes a battery cell 101, a battery microcomputer 102, a temperature detector 103, a current detector 104, a voltage detector 105, a communication unit 106, and a control unit 107. The battery cell 101 is a secondary battery such as a lithium-ion cell or a nickel-hydride cell. The battery microcomputer 102 is located in the battery pack 100 and includes the current detector 104, the voltage detector 105, the communication unit 106, and the control unit 107.

The temperature detector 103 is implemented by a temperature detecting device such as a thermistor and can calculate a resistance value of the temperature detecting device using a reference voltage. The temperature detector 103 can use a first measurement method of calculating the resistance value of the temperature detecting device using a reference voltage supplied from the battery microcomputer 102, and a second measurement method of calculating the resistance value of the temperature detecting device using a reference voltage supplied from a charging control integrated circuit (IC) 203. The temperature of the battery pack 100 can be calculated from the resistance value calculated using the first measurement method. The temperature of the battery pack 100 can be calculated from the resistance value calculated using the second measurement method.

The current detector 104 detects a charging current flowing through the battery cell 101 using the voltage of a current detecting resistor. The voltage detector 105 detects the voltage of the battery cell 101. The control unit 107 controls the current detector 104, the voltage detector 105, and the communication unit 106 and can calculate the temperature of the battery pack 100 from the resistance value calculated using the first measurement method.

The control unit 107 outputs battery state information to the communication unit 106. In the present embodiment, the charging current value detected by the current detector 104, the charging voltage value detected by the voltage detector 105, the temperature of the battery pack 100 calculated by the control unit 107, and the charge capacity of the battery cell 101 calculated by the control unit 107 are called "battery state information". The control unit 107 integrates the charging current flowing through the battery cell 101, which is detected by the current detector 104, thereby calculating the charge capacity of the battery cell 101. The communication unit 106 sends the battery state information output from the control unit 107 to the charger 200.

The charger 200 includes an alternating current (AC) input unit 201, an alternating current-to-direct current (AC/DC) converter 202, the charging control IC 203, a current control device 204, a current detecting device 205, a display unit 206, and a charger microcomputer 301. The battery microcomputer 301 is located in the charger 200 and includes a current detector 302, a voltage detector 303, a communication unit 304, and a control unit 305. The AC input unit 201 is connected to a commercial AC power supply and supplies power to the charger 200. The AC/DC converter 202 rectifies power supplied from the commercial AC power supply and converts the rectified power into a DC voltage that is easy to use.

The charging control IC 203 controls the charging current flowing through the battery pack 100. The current control device 204 is a device that restricts the charging current, such as a transistor that restricts the charging current or a diode that prevents backflow. The current detecting device 205 is, for example, a resistor that detects the charging current. The display unit 206 is a display device such as a light-emitting diode (LED) or a liquid crystal display (LCD) and informs the user of the charge state of the charger 200. The current detector 302 detects the charging current value from the value detected by the current detecting device 205. The voltage detector 303 detects the value of a charge voltage applied to a terminal of the battery pack 100. If no charge voltage is being applied, the voltage detector 303 can detect the terminal voltage of the battery pack 100 attached to the charger 200.

The control unit 305 controls charging of the battery pack 100 attached to the charger 200. The control unit 305 controls the current detector 302, the voltage detector 303, and the communication unit 304 and can calculate the temperature of the battery pack 100 from the resistance value calculated using the second measurement method. The control unit 305 integrates the charging current flowing through the battery cell 100, which is detected by the current detector 302, thereby calculating the charge capacity of the battery cell 101.

In the first embodiment, the charging current value detected by the current detector 302, the charging voltage value detected by the voltage detector 303, the temperature of the battery pack 100 calculated by the control unit 305, and the charge capacity of the battery cell 101 calculated by the control unit 305 are called "charge state information". The control unit 305 compares the charge state information with the battery state information sent from the battery microcomputer 102. If the difference between the charge state information and the battery state information exceeds a preset value, the control unit 305 determines that the battery pack 100 attached to the charger 200 is not in a normal state and sends a charging stop signal to the charging control IC 203. The communication unit 304 communicates with the communication unit 106 in the battery pack 100 and receives the battery state information.

Figure 2:
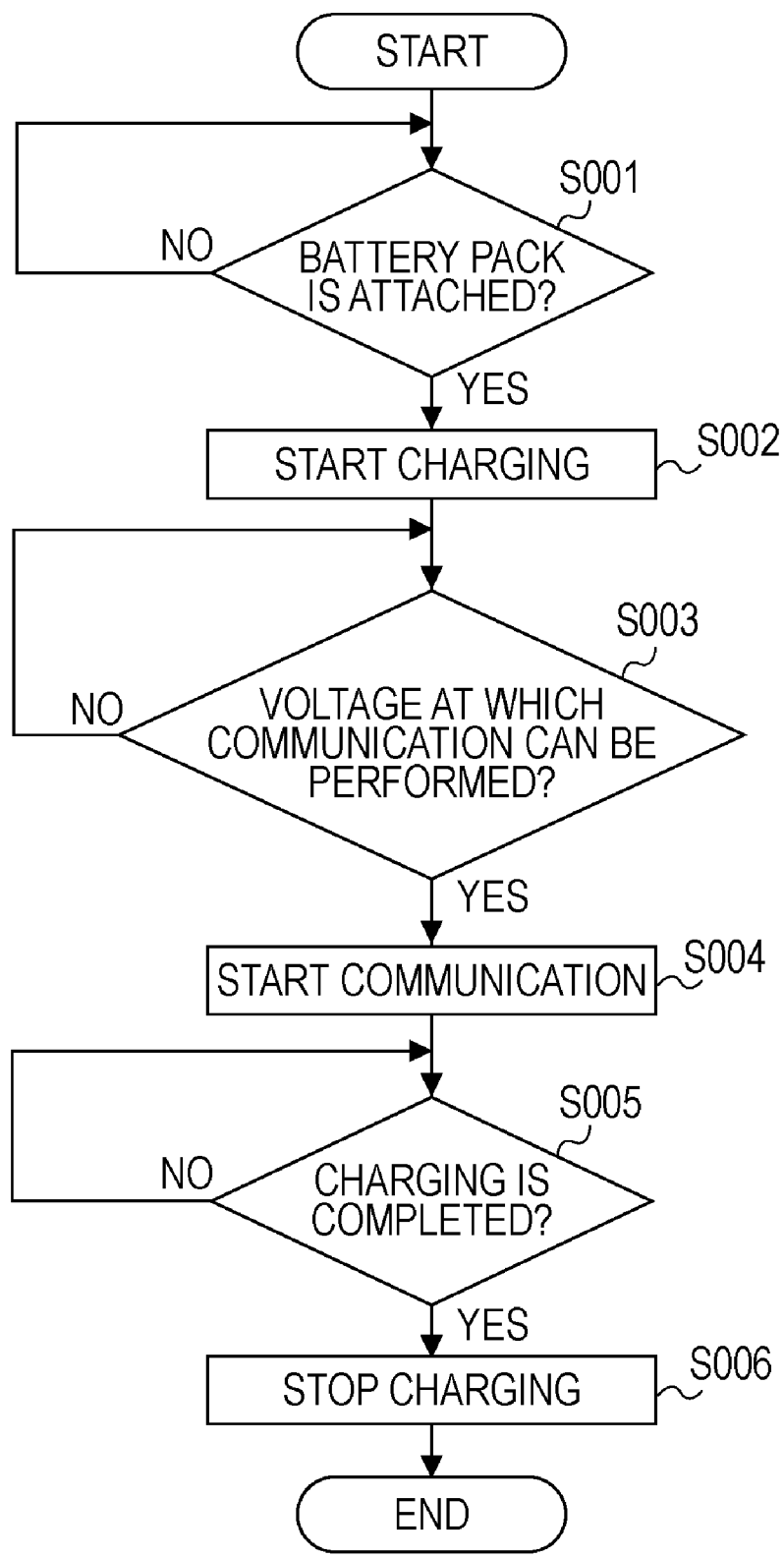
FIG. 2 is a flowchart describing an operation of charging, with the use of the charger, the battery pack attached to the charger.

FIG. 2 is a flowchart describing an operation of charging, with the use of the charger 200 that charges the battery pack 100 attached to the charger 200.

In step S001, the charger microcomputer 301 determines whether the battery pack 100 is attached to the charger 200. If it is determined that the battery pack 100 is attached to the charger 200 (YES in step S001), the flowchart proceeds from step S001 to step S002. In step S002, the charger microcomputer 301 starts charging the battery pack 100. In step S003, the voltage detector 303 detects the terminal voltage of the battery pack 100 and determines whether the terminal voltage of the battery pack 100 is a voltage value at which communication between the charger microcomputer 301 and the battery microcomputer 102 can be performed. If it is determined that the terminal voltage of the battery pack 100 is a voltage value at which communication can be performed (YES in step S003), the flowchart proceeds from step S003 to step S004.

In step S004, communication between the charger microcomputer 301 and the battery microcomputer 102 is started. Specifically, the battery microcomputer 102 sends battery state information output from the control unit 107 via the communication unit 106, and the charger microcomputer 301 receives the battery state information via the communication unit 304. In step S005, it is determined whether the charging of the battery pack 100 attached to the charger 200 is completed. Whether the charging is completed is determined depending on whether a preset completion condition is satisfied. If the completion condition is satisfied (YES in step S005), the flowchart proceeds from step S005 to step S006. In step S006, the charger microcomputer 301 controls the charging control IC 203 to stop charging. If the completion condition is not satisfied, the charging is continued.

FIG. 3 is a flowchart describing a measurement value checking operation that is repeatedly executed at 30-second intervals (predetermined time intervals) between steps S004 and S005 of the charging operation shown in FIG. 2. The measurement value checking operation is an operation of comparing, with the use of the control unit 305 in the charger microcomputer 301, the charge state information with the battery state information sent from the battery microcomputer 102 and determining whether the battery pack 100 is not in the normal state.

In step S101, the control unit 305 determines a comparison item. If the comparison item is determined as a "voltage value", the charging voltage value detected by the voltage detector 303 is compared with the charging voltage value detected by the voltage detector 105.

If the comparison item is determined as a "current value", the charge current value detected by the current detector 302 is compared with the charge current value detected by the current detector 104. If the comparison item is determined as a "temperature", the temperature of the battery pack 100 calculated by the control unit 305 is compared with the temperature of the battery pack 100 calculated by the control unit 107. If the comparison item is determined as a "charge capacity", the charge capacity of the battery cell 101 calculated by the control unit 305 is compared with the charge capacity of the battery cell 101 calculated by the control unit 107. That is, comparison is performed between the charge state information and the battery state information of the same type as the comparison item.

In step S102, the control unit 305 sets a determination value α needed to determine whether the battery pack 100 is not in a normal state. In step S103, the charger microcomputer 301 at least detects or calculates charge state information corresponding to the comparison item determined in step S101. In step S104, the charger microcomputer 301 communicates with the battery microcomputer 102 and at least receives battery state information corresponding to the comparison item determined in step S101. In step S105, the control unit 305 compares the charge state information detected or calculated in step S103 with the battery state information of the battery pack 100, which is received in step S104, and calculates the difference between the charge state information and the battery state information.

In step S106, it is determined whether the difference calculated in step S105 is less than or equal to the determination value α set in step S102. If the difference calculated in step S105 is less than or equal to the determination value α (YES in step S106), the flowchart proceeds from step S106 to step S107. In step S107, it is determined that the battery pack 100 is in the normal state, and the flowchart proceeds from step s107 to step S108. In step S108, the operation of charging the battery pack 100 is continued. In contrast, if the difference calculated in step S105 is not less than or equal to the determination value α (NO in step S106), the flowchart proceeds from step S106 to step S109. In step S109, it is determined that the battery pack 100 is not in a normal state, and the flowchart proceeds from step S109 to step S110. In step S110, the charger microcomputer 301 controls the charging control IC 203 to stop the operation of charging the battery pack 100. After the process of step S110, the measurement value checking operation shown in FIG. 3 and the charging operation shown in FIG. 2 are terminated.

As described above, according to the first embodiment, the charger 200 can determine, using battery state information received from the battery pack 100 and charge state information detected or calculated by the charger 200, whether the battery pack 100 is not in a normal state.

If the charger 200 determines that the battery pack 100 is not in a normal state, the charger 200 can stop the operation of charging the battery pack 100. Therefore, the operation of charging the battery pack 100 is safely controlled by the charger 200.

Second Embodiment

FIG. 4 is a flowchart describing a measurement value checking operation of the charger 200 according to a second embodiment of the present invention. In the second embodiment, there are described different parts of the first embodiment.

Referring to FIG. 4, steps S101 to S110 are the same as those of the measurement value checking operation according to the first embodiment described using FIG. 3. These steps are given the same reference numerals as those in FIG. 3, and descriptions are not repeated.

In step S201, the control unit 305 corrects the charge state information detected or calculated in step S103. In step S202, the control unit 305 corrects the battery state information received in step S104. For example, if the comparison item is a "voltage value", voltage drops at the measurement points are corrected in steps S201 and S202.

That is, there are factors causing voltage drops at the measurement points at which the charging voltage value is detected by the voltage detector 303 and at which the charging voltage value is detected by the voltage detector 105. Specifically, the charger microcomputer 301 and the battery microcomputer 102 correct, for example, a voltage drop due to the current control device 204 and the current detecting device 205, and a voltage drop due to a contact resistance or line impedance between the terminal of the charger 200 and the terminal of the battery pack 100.

As described above, according to the second embodiment, the charger 200 can more accurately determine, using battery state information received from the battery pack 100 and charge state information detected or calculated by the charger 200, whether the battery pack 100 is not in a normal state.

If the charger 200 determines that the battery pack 100 is not in a normal state, the charger 200 can stop the operation of charging the battery pack 100. Therefore, the operation of charging the battery pack 100 is safely controlled by the charger 200.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2007-336845 filed Dec. 27, 2007, which is hereby incorporated by reference herein in its entirety.

What is claimed is:

1. A charger that charges a battery unit including a secondary battery, comprising:
 a receiving unit that receives first information indicating a current of the secondary battery detected by the battery unit from the battery unit;
 a detection unit that detects second information indicating a current of the secondary battery;
 a determination unit that determines whether or not the battery unit is in a normal state based on the first information and the second information; and
 a control unit that controls charging of the secondary battery depending on whether or not the battery unit is in the normal state.

2. The charger according to claim 1, wherein the determination unit determines, based on a difference between the current of the secondary battery corresponding to the first information and the current of the secondary battery corresponding to the second information, whether or not the battery unit is in the normal state.

3. The charger according to claim 2, wherein the determination unit determines that the battery unit is in the normal state if the difference is less than or equal to a predetermined value, and the determination unit determines that the battery unit is not in the normal state if the difference is not less than the predetermined value.

4. The charger according to claim 1, wherein the control unit stops charging of the secondary battery if the determination unit determines that the battery unit is not in the normal state and the control unit does not stop charging of the secondary battery if the determination unit determines that the battery unit is in the normal state.

5. A charger that charges a battery unit including a secondary battery, comprising:
 a receiving unit that receives first information indicating a charge capacity of the secondary battery detected by the battery unit from the battery unit;
 a detection unit that detects second information indicating a charge capacity of the secondary battery;
 a determination unit that determines whether or not the battery unit is in a normal state based on the first information and the second information; and
 a control unit that controls charging of the secondary battery depending on whether or not the battery unit is in the normal state.

6. The charger according to claim 5, wherein the determination unit determines, based on a difference between the charge capacity of the secondary battery corresponding to the first information and the charge capacity of the secondary battery corresponding to the second information, whether or not the battery unit is in the normal state.

7. The charger according to claim 6, wherein the determination unit determines that the battery unit is in the normal state if the difference is less than or equal to a predetermined value, and the determination unit determines that the battery unit is not in the normal state if the difference is not less than the predetermined value.

8. The charger according to claim 5, wherein the control unit stops charging of the secondary battery if the determination unit determines that the battery unit is not in the normal state, and the control unit does not stop charging of the secondary battery if the determination unit determines that the battery unit is in the normal state.

9. A charger that charges a battery unit including a secondary battery, comprising:
   a receiving unit that receives first information indicating a temperature of the secondary battery detected by the battery unit from the battery unit;
   a detection unit that detects second information indicating a temperature of the secondary battery;
   a determination unit that determines whether or not the battery unit is in a normal state based on the first information and the second information; and
   a control unit that controls charging of the secondary battery depending on whether or not the battery unit is in the normal state.

10. The charger according to claim 9, wherein the determination unit determines, based on a difference between the temperature of the secondary battery corresponding to the first information and the temperature of the secondary battery corresponding to the second information, whether or not the battery unit is in the normal state.

11. The charger according to claim 10, wherein the determination unit determines that the battery unit is in the normal state if the difference is less than or equal to a predetermined value, and the determination unit determines that the battery unit is not in the normal state if the difference is not less than the predetermined value.

12. The charger according to claim 9, wherein the control unit stops charging of the secondary battery if the determination unit determines that the battery unit is not in a normal state, and the control unit does not stop charging of the secondary battery if the determination unit determines that the battery unit is in a normal state.

13. The charger according to claim 9, wherein
   the battery unit includes a temperature detector that detects the temperature of the secondary battery,
   the temperature of the secondary battery corresponding to the first information is a temperature detected by the temperature detector based on a voltage supplied to the temperature detector from the battery unit, and
   the temperature of the secondary battery corresponding to the second information is a temperature detected by the temperature detector based on a voltage supplied to the temperature detector from the charger.

14. A method for controlling a charger that charges a battery unit including a secondary battery, the method comprising:
   receiving first information indicating a current of the secondary battery detected by the battery unit from the battery unit;
   detecting second information indicating a current of the secondary battery;
   determining whether or not the battery unit is in a normal state based on the first information and the second information; and
   controlling charging of the secondary battery depending on whether or not the battery unit is in the normal state.

15. A method for controlling a charger that charges a battery unit including a secondary battery, the method comprising:
   receiving first information indicating a charge capacity of the secondary battery detected by the battery unit from the battery unit;
   detecting second information indicating a charge capacity of the secondary battery;
   determining whether or not the battery unit is in a normal state based on the first information and the second information; and
   controlling charging of the secondary battery depending on whether or not the battery unit is in the normal state.

16. A method for controlling a charger that charges a battery unit including a secondary battery, the method comprising:
   receiving first information indicating a temperature of the secondary battery detected by the battery unit from the battery unit;
   detecting second information indicating a temperature of the secondary battery;
   determining whether or not the battery unit is in a normal state based on the first information and the second information; and
   controlling charging of the secondary battery depending on whether or not the battery unit is in the normal state.

* * * * *